(12) United States Patent
Suzuki et al.

(10) Patent No.: US 6,231,977 B1
(45) Date of Patent: May 15, 2001

(54) WET FRICTION MATERIAL

(75) Inventors: Makoto Suzuki, Kakegawa; Masahiro Mori, Shizuoka-ken, both of (JP)

(73) Assignee: NSK-Warner, K. K., Tokyo (JP)

( * ) Notice: Subject to any disclaimer, the term of this patent is extended or adjusted under 35 U.S.C. 154(b) by 0 days.

(21) Appl. No.: 09/376,364

(22) Filed: Aug. 18, 1999

(30) Foreign Application Priority Data

Aug. 19, 1998 (JP) .................................................. 10-232473

(51) Int. Cl.$^7$ ....................................................... C08J 5/14
(52) U.S. Cl. ........................ 428/375; 523/156; 523/157; 508/154; 508/161
(58) Field of Search ................................. 508/154, 161; 523/157, 156; 428/375

(56) References Cited

U.S. PATENT DOCUMENTS 5,250,588 * 10/1993 Delvaux et al. ...................... 523/159
5,453,317 * 9/1995 Yesnik ................................... 428/283
5,529,666 * 6/1996 Yesnik ................................... 428/283
5,563,196 * 10/1996 Kitahara et al. ....................... 534/14

FOREIGN PATENT DOCUMENTS

60020935 * 7/1983 (JP) .
01288639 * 5/1988 (JP) .
07018094 * 6/1993 (JP) .
0720121 * 1/1994 (JP) .
09059599 * 8/1995 (JP) .

* cited by examiner

Primary Examiner—Jacqueline V. Howard
(74) Attorney, Agent, or Firm—Vorys, Sater, Seymour and Pease LLP

(57) ABSTRACT

A wet friction material with small initial variations in friction coefficient, suppressing occurrence of heat spots, and with excellent heat resistance and friction resistance is provided. In the wet friction material including a fiber base material, a filler, a friction controller, and a resin binder, the resin binder is a phenolic resin modified with p-nonyl phenol.

3 Claims, 2 Drawing Sheets

WET FRICTION MATERIAL

BACKGROUND OF THE INVENTION

1. Field of the Invention

The present invention relates to a wet friction material employed in friction engagement devices such as clutches and brakes used in oil in automatic transmissions of automobiles.

2. Related Background Art

An automatic transmission of an automobile, which is incorporated with a multiple-disc clutch comprising a plurality of friction plates formed by adhering a wet friction material on the surface a base plate (core plate) generally made of metals and separator plates as a friction counterpart made of a single sheet such as a metal sheet in an alternative manner, transmits or breaks a driving force by contacting these plates mutually under pressure or releasing the contact in an automatic transmission fluid (ATF) employed as a lubricant oil.

Paper wet friction materials called "paper friction materials" are generally employed as wet friction materials for friction engagement devices used in these oils. The wet friction materials are generally obtained by subjecting a fiber base material such as natural pulp fibers, organic synthetic fibers and inorganic fibers together with a filler such as diatomaceous earth as cashew resin and a friction controller to wet paper machining followed by impregnation of a resin binder comprising a thermosetting resin and heat hardening.

In the paper wet friction materials, thermosetting resins impregnated in machined paper material as resin binders not only bind a fiber base material and a filler, etc. and retain binding but also greatly affect friction properties and friction resistance of the wet friction materials. As resin binders, phenolic resins with excellent heat-resistance, high mechanical strength, and relatively good friction resistance are generally employed. The phenolic resins are produced by addition polymerization of phenols, such as phenol and cresol, and aldehydes, such as formaldehyde and paraformaldehyde, in the presence of an acid catalyst or alkaline catalyst. In the case of wet friction materials, resol-type phenolic resins obtained by addition polymerization in the presence of an alkaline catalyst are generally employed. As phenolic resins, unmodified phenolic resins have been employed practically in the past. They have such problems, however, that initial variations in friction coefficient are large in such a manner that a friction coefficient is low in an early phase due to local contact of a friction surface because they have a high cross-linking density and are thus hard, and a friction coefficient becomes higher with use due to increased conformability; and that burned spots called heat spots are generated due to a high temperature on a friction surface on a friction counterpart (separator plate) under high temperature and high load conditions, resulting of lack in long-term stability of friction properties.

In recent years, in order to improve these problems, modified phenolic resins have been extensively investigated and oil-modified phenolic resins and epoxy-modified phenolic resins, etc. with excellent flexibility have been studied and some of them have already been employed practically. These modified phenolic resins, however, are still inferior to unmodified phenolic resins in terms of heat resistance and friction resistance. Thus, satisfactory ones have not yet been attained.

SUMMARY OF THE INVENTION

Therefore, an object of the present invention is to provide a wet friction material that exhibits small initial variations in friction coefficient, suppresses generation of heat spots, and is excellent in heat resistance and friction resistance.

In order to attain the above object, a wet friction material of the present invention is characterized in that a resin binder is a phenolic resin modified with p-nonyl phenol in a wet friction material comprising a fiber base material, a filler, a friction controller, and a resin binder.

The present inventors focused on to modification of phenolic resins as resin binders, and investigated materials used for the modification. As a result, we found that a wet friction material comprising, as a resin binder, p-nonyl phenol-modified phenolic resin obtained using a bifunctional p-nonyl phenol having a nonyl group at a para-position against OH-group of phenol, one of phenols as a material for modification of phenols, is excellent in flexibility and also has heat resistance and friction resistance comparable or superior to those of unmodified phenolic resins.

Although the reason for this improved performance is not completely understood, it is hypothesized that when a p-nonyl phenol-modified phenolic resin, in which hydrophilic phenol or methylol phenol, etc. and p-nonyl phenol having a hydrophilic hydroxy group and lyophilic nonyl group ($-C_9H_{19}$) or its methylol compound, etc. are present together, is employed as a resin binder for a paper friction material, hydrophilic compounds with a low molecular weight such as phenol or methylol phenol penetrate well in capillary spaces of a fiber base material, while p-nonyl phenol, with a relatively high molecular weight or its methylol compounds, etc., covers the surface of the fiber base material to enable it to retain porosity of the fiber base material of the wet friction material, to be excellent in flexibility, and also to secure mechanical strength.

The p-nonyl phenol-modified phenolic resins employed as resin binders according to the present invention are obtained by either of known methods comprising charging phenol, p-nonyl phenol, aldehydes, and a catalyst in a reaction tank, then heating for copolymerization, subjecting to dehydration treatment, and adding a solvent to adjust involatile components; and comprising charging phenol, aldehydes, and a catalyst in a reaction tank, then charging p-nonyl phenol, aldehydes, and a catalyst in another reaction tank, and then separately heating for addition polymerization, subjecting to dehydration treatment, adding a solvent to adjust involatile component, and after that, combining unmodified phenolic resin and p-nonyl phenolic resin thus obtained to form one liquid. A molar ratio of aldehydes to phenols is 1:1 to 2.5:1.

As aldehydes, formaldehyde, paraformaldehyde, benzaldehyde, etc. are employed.

As a catalyst employed for synthesis, alkalis such as sodium hydroxide, potassium hydroxide, barium hydroxide, and calcium hydroxide and ammonia and amines such as triethylamine are employed alone or as a combination of two or more.

As a solvent, alcohols such as methanol and ethanol, glycols such as ethylene glycol, diethylene glycol, propylene glycol and dipropylene glycol, as well as ethers, esters, ether esters, ketones or the like are employed alone or as a combination of two or more.

An amount of p-nonyl phenol employed to modify phenols is preferably 5 to 60 mol %, more preferably 10 to 50 mol % of the phenols. An amount of p-nonyl phenol for modification less than 5 mol % cannot provide sufficient flexibility to resins after setting, so that difficulties due to a local contact between a wet friction material and a friction counterpart material cannot be fully improved. On the other hand, when an amount of p-nonyl phenol for modification exceeds 60 mol %, heat resistance of resins after setting is reduced due to a decrease in cross-linking density of the resins. It is thus not preferable due to decreases in heat resistance and friction resistance.

Machined paper materials employed according to the present invention are manufactured by ordinary methods from slurry solutions in which a fiber base material such as natural pulp fibers such as wood pulp, organic synthetic fibers such as aramid, and inorganic fibers such as glass, a filler, and a friction controller such as cashew resin are suspended in water in a predetermined ratio and they are not limited specifically.

To the machined paper material, 20 to 80 parts by weight of the above-mentioned p-nonyl phenol-modified phenolic resin is impregnated to 100 parts by weight of the base material, dried, and heated at about 150 to 250° C. for 15 to 30 minutes to be set. Then the resin is punched out in a predetermined shape and integrated with a base plate (core plate) coated with an adhesive by heat press to obtain a friction plate. Other methods may be also employed without limitation.

In the wet friction material thus obtained, a contacting area of the surface of a friction material is increased due to an increase in flexibility, no burning spots called heat spots due to local contacts are generated on a friction counterpart (separator plate), and a high and stable friction coefficient with less initial variations can be obtained. In addition, deterioration of heat resistance and friction resistance observed for oil-modified resins, etc. is not observed, and heat resistance and friction resistance comparable or superior to those of unmodified phenolic resin are obtained.

DETAILED DESCRIPTION OF THE PREFERRED EMBODIMENTS

Although the embodiments of the present invention will be explained in detail referring to the attached drawings, it is needless to say that they serve merely as examples and do not limit the present invention.

(Manufacturing of Machined Paper Material)

A mixture comprising 35 wt % of cellulose fiber and 20 wt % of aramid fiber as components of a fiber material and 45 wt % of diatomaceous earth (filler) with a friction controller is dispersed into water to form a slurry liquid. A substance obtained by machining from the slurry is dried to obtain machined paper material.

Embodiment

To 1,000 parts by weight of phenol, 250 parts by weight of p-nonyl phenol, 1,500 parts by weight of 37% formalin, and 20 parts by weight of 20% caustic soda were added, and the mixture was reacted at 100° C. for 2 hours. The reaction mixture was dehydrated in vacuo at 650 mmHg. When the temperature of the liquid reached 70° C., 1,000 parts by weight of methyl ethyl ketone was added to obtain a liquid p-nonyl phenol-modified phenolic resin containing 50% of involatile components. The resin was diluted with methanol and impregnated into the above-described machined paper material, dried, and heated at 200° C. for 30 minutes for setting. A wet friction material comprising 40 parts by weight of the resin to 100 parts by weight of the machined paper material was obtained. The wet friction material was then punched out into a ring with an outer diameter of 130 mm and an inner diameter of 100 mm. The ring was kept under a pressure of 50 kg/cm² or higher in a die heated at 200° C. for 30 seconds. The ring was integrated with a metal core plate to obtain a friction plate with a diameter of 130 mm and a thickness of 2.3 mm.

Comparative Example

To 1,000 parts by weight of phenol, 1,050 parts by weight of 37% formalin and 10 parts by weight of 20% caustic soda were added, and the mixture was reacted at 100° C. for 1 hour. The mixture was then dehydrated in vacuo at 650 mmHg. When the temperature of the liquid became 70° C., 750 parts by weight of methanol was added to obtain a liquid unmodified phenolic resin containing 50% of involatile components. The resin was diluted with methanol and impregnated into the above-described machined paper material, dried, and heated at 150° C. for 30 minutes for setting. A wet friction material comprising 40 parts by weight of the resin to 100 parts by weight of the manufactured paper was obtained. A friction plate with a diameter of 130 mm and a thickness of 2.3 mm was obtained according to a method similar to that in the Embodiment.

Evaluation Test

The wet friction materials of the Embodiment and the Comparative Example were subjected to tests evaluating friction properties, durability, and friction resistance. The results will be explained below.

TABLE 1

| Item | |
| --- | --- |
| Rotation number (rpm) | 3,600 |
| Inertia (kg · m) | 0.343 |
| Face pressure (KPa) | 785 |
| Oil temperature (° C.) | 100 |
| Oil volume (cc) | 700 |

Figure 1:
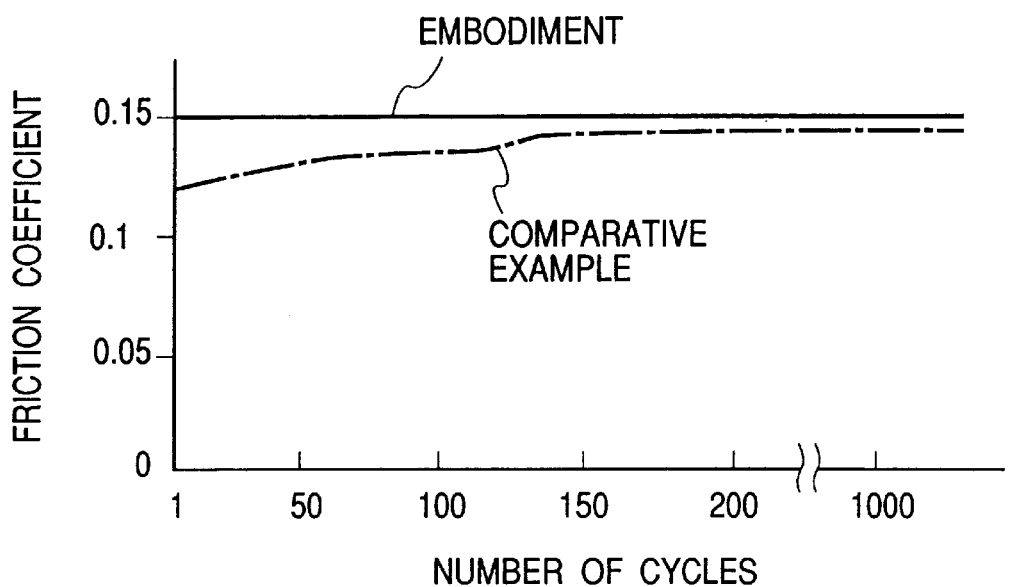
FIG. 1 is a graph showing the changes in friction coefficient by the number of cycles.

FIG. 1 is a graph showing the changes in friction coefficient by the number of cycles according to the test conditions shown in Table 1. The solid line shows the Embodiment according to the present invention and the dotted line shows the Comparative Example (prior art). As shown by the graph in FIG. 1, the friction coefficient of the conventional friction material was low when the number of cycles was small, then increased with an increase in the number of cycles, and then became almost constant. On the other hand, for the friction material according to the present invention, it is shown that the friction coefficient was almost constant with less changes from the early phase. In other words, the graph shows that the friction material of the present invention is excellent in early compatibility.

TABLE 2

| Item | |
| --- | --- |
| Rotation number (rpm) | 7,600 |
| Inertia (kg · m) | 0.123 |
| Face pressure (KPa) | 519.4 |
| Number of cycles (times) | 5 |
| Oil temperature (° C.) | 100 |
| Oil volume (cc) | 0.075 |

Figure 2:
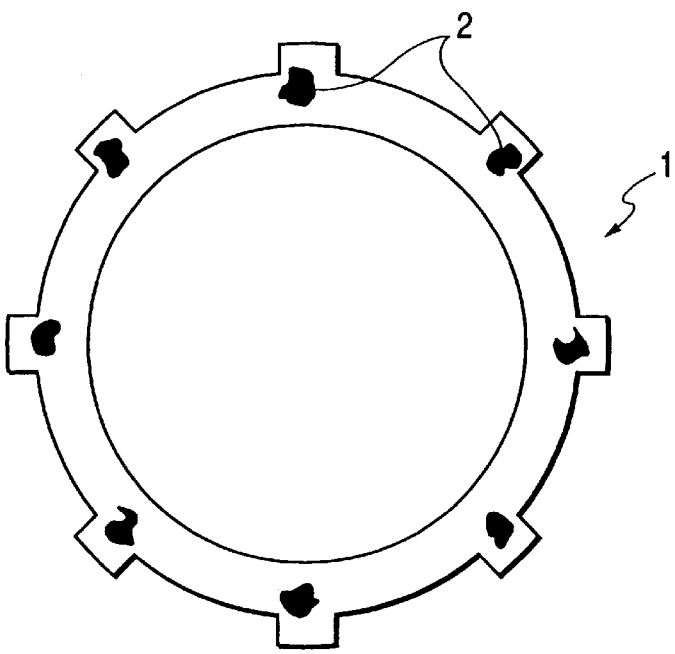
FIG. 2 is an elevation view of a separator plate using a conventional friction material after testing according to Table 2.
Figure 3:
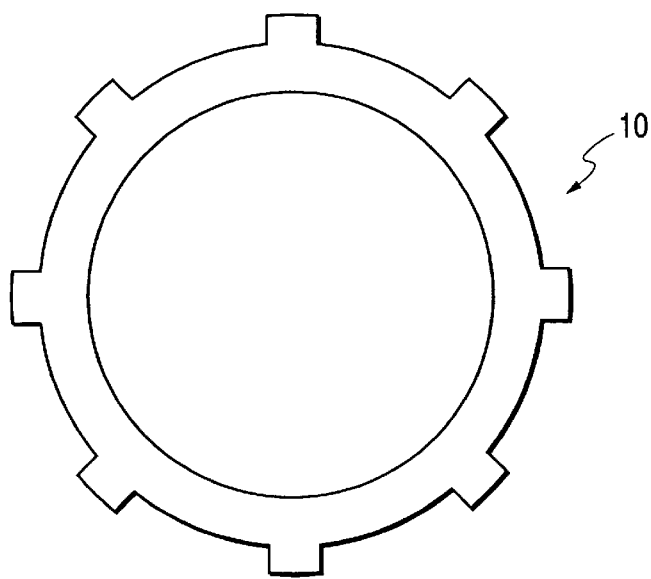
FIG. 3 is an elevation view of a separator plate using a friction material according to the present invention after testing according to Table 2.

A heat-spot resistance test was conducted according to the above test conditions. FIG. 2 shows a status of a separator plate 1 as a friction counterpart tested using the friction material of the Comparative Example (prior art), and FIG. 3 shows a status of a separator plate 10 as a friction counterpart tested using the friction material according to the present invention. In FIG. 2, occurrence of a number of heat spots 2 (black change due to burning) is observed. In FIG. 3, on the other hand, those spots are not observed. In other words, it is shown that the use of the friction material of the present invention has the effect of preventing heat spots (black change due to burning). One cycle consists of a contact under pressure and a release of the contact.

TABLE 3

| Item | |
| --- | --- |
| Rotation number (rpm) | 7,600 |
| Inertia (kg · m) | 0.123 |
| Face pressure (KPa) | 519.4 |
| Oil temperature (° C.) | 100 |
| Oil volume (L/min) | 0.36 |

Figure 4:
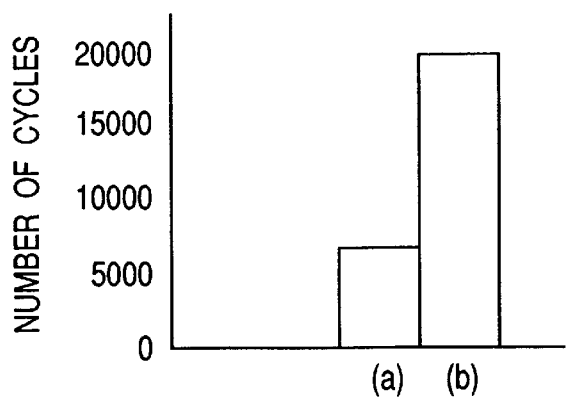
FIG. 4 is a graph showing a comparison of life cycle.

FIG. 4 is a graph comparing life cycle between the Embodiment and the Comparative Example according to the test conditions shown in Table 3. Bar (a) shows the Comparative Example, and Bar (b) shows the Embodiment. As shown in FIG. 4, the friction material of the present invention has a longer life than that of the Comparative Example.

Figure 5:
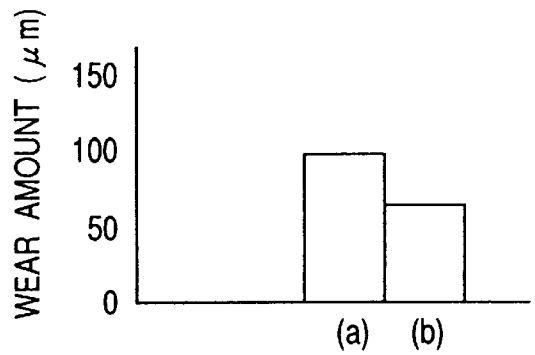
FIG. 5 is a graph showing a comparison of wear amount.

FIG. 5 is a graph comparing wear amount between the Embodiment and the Comparative Example according to the test conditions shown in Table 3. Bar (a) shows the Comparative Example, and Bar (b) shows the Embodiment. As shown in FIG. 5, the wear amount was smaller for the friction material of the present invention than for the Comparative Example.

As mentioned above, the wet friction material of the present invention comprises a fiber base material such as natural pulp fibers, organic synthetic fibers, and inorganic fibers, a filler such as diatomaceous earth, a friction controller, and a p-nonyl phenol-modified phenol as a resin binder.

Since this wet friction material comprises a p-nonyl phenol-modified phenol as a resin binder, flexibility can be enhanced as compared to unmodified ones, and initial compatibility due to local contacts and heat-spot resistance can be greatly improved. In addition, it has heat resistance and durability comparable or superior to unmodified ones. It can sufficiently cope with reductions in size and weight of a friction engagement device in the latest automatic transmissions and with increases in rotation number and power of automobile engines.

What is claimed is:

1. A wet friction material comprising:

a fiber base material;

a filler;

a friction controller; and a resin binder, wherein said resin binder is a phenolic resin modified with p-nonyl phenol.

2. The wet friction material as set forth in claim 1, wherein said resin binder comprises phenol and p-nonyl phenol as phenols.

3. The wet friction material as set forth in claim 1, wherein an amount of p-nonyl phenol is 5 to 60 mol % of the phenol content of said resin binder.

* * * * *